Aug. 23, 1966  J. H. DE CLAIRE ET AL  3,267,537

BUCKLE FOR LUGGAGE STRAPS AND THE LIKE

Filed June 29, 1964  2 Sheets-Sheet 1

INVENTORS
James H. DeClaire
BY & Akira Tanaka

Edward C. James
ATTORNEY

Aug. 23, 1966  J. H. DE CLAIRE ET AL  3,267,537
BUCKLE FOR LUGGAGE STRAPS AND THE LIKE
Filed June 29, 1964  2 Sheets-Sheet 2

INVENTORS
James H. DeClaire
BY & Akira Tanaka
Edward E. James
ATTORNEY

United States Patent Office 3,267,537
Patented August 23, 1966

3,267,537
BUCKLE FOR LUGGAGE STRAPS AND THE LIKE
James H. De Claire, East Detroit, and Akira Tanaka, Southfield, Mich., assignors to General Motors Corporation, Detroit, Mich., a corporation of Delaware
Filed June 29, 1964, Ser. No. 378,673
8 Claims. (Cl. 24—75)

This invention relates to two-piece buckles for securing separate strap or belt ends together and providing strap tightening adjustment and release.

The invention contemplates an improved buckle of the type indicated suitably formed of simple compact sheet metal stampings which facilitate quick easily effected buckle interengagement and release, provide structural cooperation assuring adequate strap holding strength, and preclude accidental or unintentional buckle release. The invention further provides an improved buckle associated strap adjusting means of simple design cooperative to cushion the interengaged buckle members, to provide simple easy strap tightening adjustment and to assure maintenance of effected adjustment.

Two buckles embodying the several aspects of the invention are herein shown and described in combination with luggage or cargo holding straps or belt portions removably secured or anchored at spaced opposite ends to the load carrying floor of a vehicle body. In such an environment, the illustrative buckle members may be used to secure and tighten the adjacent ends of the straps together so as to maintain the luggage or cargo against inertial forces acting thereon. While the illustrative buckles have particular utility in such a vehicle environment, potential use of the invention is not deemed to be so limited. Buckles constructed in accordance with the invention may be used with similar advantage in other applications.

The foregoing and various other objects, advantages and features of the invention will be apparent from the following description of the several illustrative embodiments, having reference to the accompanying drawings, in which.

Figure 1:
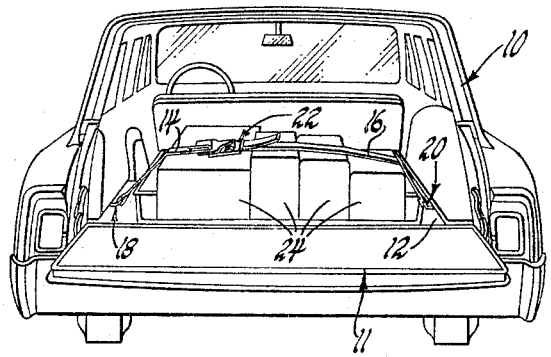
FIGURE 1 is a perspective view looking forwardly of a station wagon type vehicle body with the rear window and tailgate lowered to show the vehicle interior and two floor anchored belts or straps securing several pieces of luggage or cargo containers by the cooperative interconnection of two buckle members embodying the invention.

Referring more particularly to FIGURE 1, a vehicle body of station wagon type is indicated generally by the reference numeral 10. The rear window and tailgate of the body are shown in a lowered horizontal position indicated at 11 thus opening the rear of the vehicle for loading access to the rear floor or load carrying deck 12 of the interior body compartment. Two luggage or cargo securing belt straps 14 and 16 are removably anchored at 18 and 20, respectively, to laterally opposite sides of this rear load floor of the body. These two belt straps are interconnected inwardly of the vehicle and adjustably tightened by a buckle structure 22 constructed in accordance with the invention. A number of luggage or cargo containers 24 may thus be secured transversely of the vehicle against inertial forces resulting from acceleration, deceleration or cornering of the vehicle.

Figure 2:
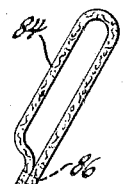
FIGURE 2 is an enlarged fragmentary sectional view showing the buckle interconnected ends of the two luggage securing straps of FIGURE 1 and the floor anchored connection of one of the straps.
Figure 2:
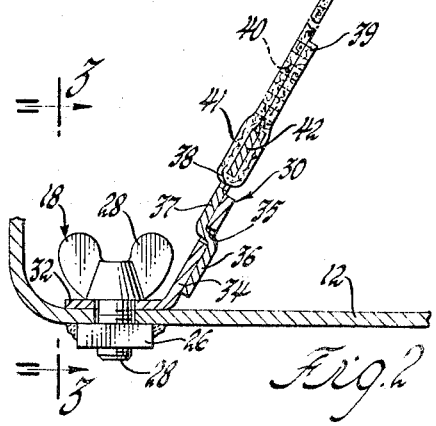
Figure 3:
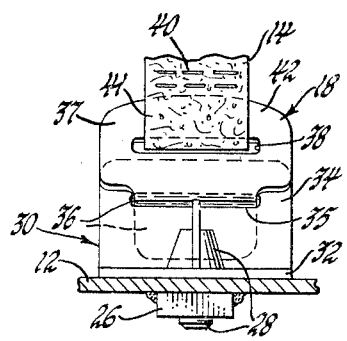
FIGURE 3 is a fragmentary sectional view taken substantially in the plane indicated at 3—3 of FIGURE 2 and shows the floor anchored strap connection.

The belt strap anchors 18 and 20 are substantially identical. Hence, the following description of the left anchor 18 is equally applicable to the belt anchoring means provided at 20. As shown in FIGURES 2 and 3, each anchor includes a nut 26 suitably secured to the underside of the floor panel 12 in axial alignment with one of a series of perforations opening through the floor panel slightly inwardly of each interior side wall of the load compartment. A wing-headed bolt 28 may be threadably tightened or loosened by hand relative to each of the floor attached nuts to removably secure a perforated base flange 32 of an angled anchor bracket 30 to the upper surface of the floor panel.

Each anchor bracket has an upstanding vertically inclined flange 34 which is perforated adjacent its upper end to provide a transverse slot 35. This slot is adapted to receive an offset end portion or tongue 36 of a stamped buckle member 37. The opposite end of this buckle member is suitably secured to one end of the belt 14. In the illustrative embodiment, this belt attached end portion is slightly wider than the buckle tongue portion 36 and is perforated to form a transverse slot 38. The buckle attached belt end 39 is threaded through this slot, folded over and then stitched to the adjacent belt portion at 40 to form an end loop 41. This belt end loop embraces an end bar 42 formed by the belt receiving slot in the buckle member.

After insertion of the buckle tongue 36 through the slot 35 of the anchor bracket, the buckle 37 is normally rotated in a clockwise direction as viewed in FIGURE 2. Such buckle rotation carries the tongue into limiting abutment with the lower underside of the inclined bracket flange 34. The portion of the buckle member intermediate the tongue 36 and the slot 38 is similarly rotated into engagement with the upper surface of the bracket end bar 42. The offset buckle end portions thus cooperate to anchor the buckle 37 securely against load securing forces tensively applied to the belt 14. As indicated above, the distal end of the belt 16 may be detachably secured or anchored at 20 to the opposite side of the floor panel 12 by a similar anchor bracket and buckle.

Figure 4:
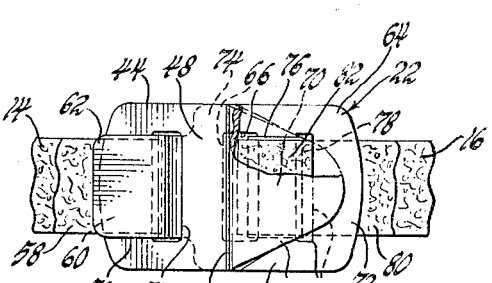
FIGURE 4 is a fragmentary plan view of the buckle interconnection and is taken substantially in the direction of the arrows indicated at 4—4 of FIGURE 2 with a portion of one of the buckle members broken away.
Figure 5:
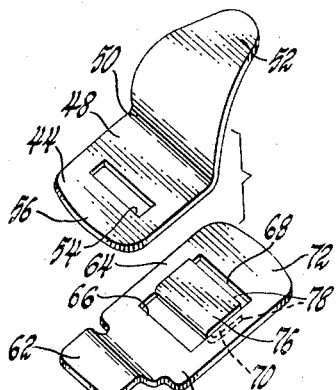
FIGURE 5 is an exploded perspective view of the two interlocking buckle members shown in FIGURES 2-4.

Referring now to FIGURES 2, 4 and 5, the buckle 22 includes two interlocking buckle members 44 and 46 attachable to the belt straps 14 and 16, respectively. These buckle members are preferably stamped from suitable sheet metal stock to provide desired interengageable contours. The buckle member 44 is bent intermediate its ends at 50 to form a relatively flat end portion attachable to the belt strap 14 and a raised offset end portion 52. This buckle member is perforated at 54 to form a transverse slot spaced from and parallel to the bend 50. The slot 54 thus divides the flat end portion of member 44 into an intermediate buckle portion 48 adjacent the bend and a transverse end bar 56. The end of the belt strap distal from the floor anchor 18 is threaded upwardly through the slot 54 and folded over at 58. This folded end portion of the belt strap may be left free for belt adjustment or stitched or otherwise suitably secured to the adjacent underlying belt portion to form an end loop 60 embracing the buckle end bar 56.

In addition to receiving the belt end loop 60, the transverse slot 54 in the buckle member 44 is of a size to receive a raised end portion 62 forming a buckle tongue on the member 46. This tongue is insertable upwardly through the slot 54 as viewed in FIGURE 2 and extends in offset parallel relation to the remainder or other end portion 64 of the buckle member 46. This other end portion is relatively flat and preferably somewhat wider than the tongue portion. Two spaced transverse slots 66 and 68 intersect this flat buckle end portion in spaced parallel relation to the tongue 62. The buckle end portion 64 is thus divided into a transverse bar 70 intermediate the two slots, a transverse end bar 72, and a transverse bar portion 74 adjacent the upstanding flange of the offset buckle tongue 62.

As best shown in FIGURES 2 and 4, a belt clamping member 76 of relatively deep U-section is slidably mounted on intermediate bar 70 of the buckle member 46. The rounded bight portion of the member 76 extends through the slot 66 and normally abuts the bar 70 in spaced opposing relation to the transverse buckle portion 74. When the bight portion is in such abutment, the opposite edges 78 of the member 76 overlie the slot 68 in spaced belt clamping relation to the adjacent edge of the transverse end bar of the buckle member 46.

The buckle attached end portion 80 of the belt strap 16 distal from the floor anchor 20 is threaded upwardly through the buckle slot 66 between the bight of the belt clamping member 76 and the opposing edge of the transverse portion 74 of the buckle member 46. The belt end is then threaded downwardly through the slot 68 between the opposing edges of the buckle end bar 72 and of the slidable belt clamping member 76 thus forming a belt loop 82 embracing the belt clamping member. Under buckle load securing conditions, the belt end portion 80 then passes between the buckle end bar 72 and the adjacent underlying portion of the tensioned belt strap 16 which urges the member 76 into belt clamping engagement. The belt end is preferably folded over at 84 and stitched at 86 to form a belt end loop. This belt end loop may be used as a hand pull for belt tightening adjustment and prevents accidental withdrawal of the belt from the buckle member 46. A similar belt end loop may be provided to prevent accidental withdrawal of the belt 14 from the buckle member 44 when the end bar embracing belt loop 60 is not secured.

Lengthening adjustment of the belt strap 16 is normally accomplished only when the two buckle members are disengaged. Such belt adjustment is effected by pulling the buckle member normally of the floor anchored belt strap. Such buckle pulling movement slidable shifts the U-shaped member 76 out of belt clamping relation with the adjacent edge of the buckle end bar 72 and releases the belt end portion 80 for withdrawal. In the absence of suitable means securing the buckle attaching loop 60, the belt strap 14 is freely slidable in either direction through the buckle slot 54 whenever the two buckle members are disengaged. The available effective length of the belt strap 14 may be thus alternately shortened or lengthened as desired.

After the luggage or cargo load 24 has been placed on the rear floor of the illustrative vehicle, either one or both buckle members may be adjusted on their respective belt straps depending upon how the buckle member 44 has been attached. Such belt adjustment is preferably effected prior to buckle engagement to provide an available length of belt sufficient to loosely engage the load when the two buckle members are initially joined. The belt looseness or slack thus provided permits the buckle tongue 62 to be easily inserted through the transverse slot 54 provided in the buckle member 44. After such tongue insertion, the two buckle members are rotated relative to each other toward the position shown in FIGURE 2. In this initially engaged buckle position, the tongue 62 loosely engages the belt loop 60 overlying buckle end bar 56 with the tongue adjacent buckle portion 74 in at least proximate engagement with the transverse intermediate portion 48 of buckle member 44.

After such initial buckle interengagement, the belt straps may be adjustably tightened to secure the load by pulling the belt end 80. Such pulling of the belt end 80 tends to shift the member 76 away from belt clamping engagement with the buckle end bar 72. If permitted, similar adjustment may be accomplished by pulling the belt end 54 between the buckle tongue 62 and buckle end bar 56. Such tightening of the belt against the load positively interlocks the buckle members against load release and clamps the belt straps securely in their tensively adjusted positions. The belt clamping action thus provided tends to cushion relative movement between the interlocked buckle members.

The tensive load applied to the buckle member 46 rotates the tongue portion 62 downwardly into clamping engagement with the belt loop 60 passing over the buckle end bar 56 and maintains the tongue adjacent buckle portion 74 in limiting engagement with the intermediate portion 48 of buckle member 44. The belt tightening tensive load applied to the buckle member 44 similarly rotates the upwardly bent portion 52 of this member downwardly into clamping engagement with the adjacent belt portion passing over the bight portion of the slide member 76. Such belt clamping engagement by this bent buckle portion slidably cams and maintains the slide member in belt clamping relation with the buckle end bar 72.

The two buckle members 44 and 46 may be easily disengaged to release the load for removal from the vehicle by manually lifting the raised offset end portion 52 of the buckle member 44. The resultant rotation of this buckle member relative to the raised offset tongue 62 of the other buckle member effectively disengages the cooperating slot and tongue of these two buckle members.

Figure 6:
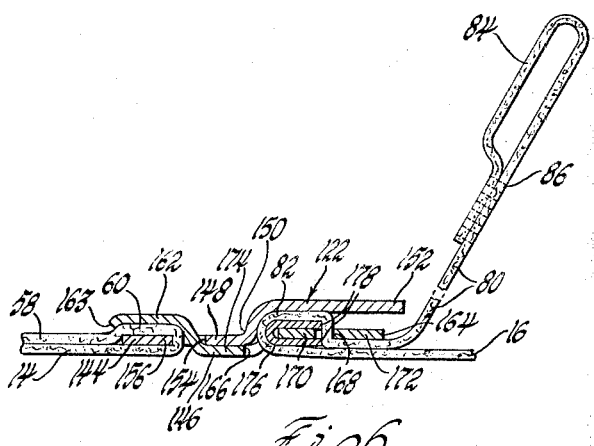
FIGURE 6 is a view similar to a portion of FIGURE 2 and shows a slightly modified buckle connection.
Figure 7:
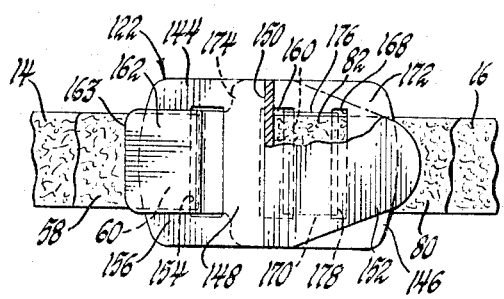
FIGURE 7 is a plan elevational view similar to FIGURE 4 and further illustrates the modified buckle members of FIGURE 6.
Figure 8:
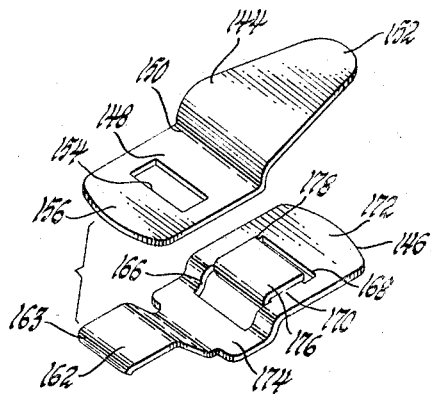
FIGURE 8 is an exploded perspective view similar to FIGURE 5 and further illustrates the cooperative configuration of the two modified buckle members of FIGURES 6 and 7.

Except as indicated below, the several elements of the modified buckle shown in FIGURES 6–8 generally correspond to similar elements of the previous embodiments. Such like components are identified by adding 100 to the reference numerals applied to the corresponding structure of the previous embodiment and need not be described in detail. Hence, the modified buckle is identified generally by the reference numeral 122.

In this form of the invention, the buckle member 146 is formed so that the end of the buckle tongue 162 is bent slightly downwardly at 163 to assure belt clamping cooperation with the adjacent edges of the end bar 156 formed on the buckle member 144 by the transverse slot 154. The slotted opposite end of the buckle member 146 is bent upwardly outwardly of the slot 166 to offset or raise the intermediate bar 170 and the end bar 172 in coplanar spaced parallel relation to the slightly lower transverse buckle portion 174 formed intermediate the tongue 162 and the slot. This offsetting of the intermediate and end bars of buckle member 146 facilitates mounting of the belt clamping slide bar 176 on the bar 170 and permits coplanar alignment of the belt straps 14 and 16 with the intermediate buckle portion 174. The resultant raising of slide member embracing belt loop 82 also cooperates with the modified contour of the offset end portion 152 of buckle member 144 to provide improved belt clamping action with the adjacent bight and upper surface of the slide member.

From the foregoing description, it will be seen that the illustrative embodiments provide improved buckle structures of relatively simple design capable of providing the several stated objects and advantages. It will be further apparent that various modifications, changes and departures might be made in and from these illustrative buckles without departing from the spirit and scope of the following claims.

We claim:
1. A buckle for connecting separate strap ends comprising
two relatively flat buckle members formed from sheet metal stock,
one of said buckle members being bent intermediate its ends to form offset end portions and having a transverse slot adjacent one end forming an end bar embraceable by a first strap attaching end loop threaded through said slot,
the other buckle member having an end portion of reduced width bent to form a tongue insertable through the strap threaded slot in said one buckle member to interengage said buckle members and normally clamping the first strap end loop against the end bar of said one buckle member,
the wider end portion of the other buckle member having two transverse parallel slots therein spaced from the tongue end portion and forming a first transverse bar extending between the two slots, a second transverse end bar and an intermediate buckle portion adjacent the bent tongue end portion,
said tongue adjacent buckle portion being engageable with the one buckle member intermediate the slot and the bent offset other end portion upon insertion of said tongue end portion into buckle securing engagement through the slot in said one buckle member,
and a strap adjusting member of channeled U-section slidably mounted on the first transverse bar of the other buckle member and opening toward said second end bar for strap clamping engagement therebetween,
said parallel slots being adapted to threadably receive a second strap end loop embracing the strap adjusting member and passing under the second end bar for adjustment of the second strap relative to the other buckle member, tightening adjustment of the second strap tending to shift and maintain said adjusting member into strap securing engagement against the second end bar,
the bent intermediate and other offset end portions of the one buckle member engaging the second strap end loop during strap tightening buckle interengagement and slidably camming said adjusting member into positive strap securing engagement with the second end bar and being liftable to disengage the one buckle member from the second strap end loop and the tongue end portion of the other buckle member.

2. In a buckle for interconnecting separate strap ends against tensive loads applied thereto comprising
a first buckle member having means for attaching a first strap end portion thereto,
a second buckle member having a portion interengageable with said first buckle member to secure said straps together,
said second buckle member forming two transverse bars spaced from the buckle interengaging portion thereof,
and a strap adjusting member of channeled U-section slidably mounted on one bar of the second buckle member and opening toward the other bar for strap clamping engagement therebetween,
said second buckle member threadably receiving a second strap end portion embracing the strap adjusting member and passing under the second end bar for tightening adjustment of the second strap relative to the first buckle member and tending to shift said adjusting member into strap securing engagement against the second buckle end bar.

3. In a buckle as set forth in claim 2, said first member having an intermediate portion engageable with the second strap end portion during strap tightening buckle interengagement and operable to slidably cam the adjusting member into positive strap securing engagement with the second end bar.

4. A buckle for interconnecting first and second strap ends, said buckle comprising
first and second buckle members,
said first buckle member having relatively flat offset end portions and a transverse slot in one end portion thereof forming an end bar embraceable by a first strap attaching end loop threaded through said slot,
said second buckle member having a first end portion of reduced width forming a tongue insertable through the slot in said first buckle member to interengage said buckle members and normally clamping the first strap end loop against the first buckle end bar,
the other end portion of the second buckle member being offset from the tongue end portion and having two transverse parallel slots therein spaced from the tongue end portion and forming a first transverse bar extending between the two parallel slots, a second transverse end bar and an intermediate buckle portion pivotally engageable with the first buckle member upon buckle engaging insertion of the adjacent tongue end portion through the slot in the first buckle member,
and a strap adjusting member of channeled U-section slidably mounted on the first bar of the second buckle member and having a rounded bight portion ending through the slot formed adjacent the intermediate buckle portion and opening toward and having spaced parallel edges overlying the other parallel slot for strap clamping engagement with the adjacent second buckle end bar,
said parallel slots being adapted to threadably receive a second strap end loop portion embracing the strap adjusting member and passing under the second buckle end bar for adjustment of the second strap relative to the second buckle member, tensive tightening of the second strap tending to shift and maintain the adjusting member into strap securing engagement against said second buckle end bar,
the intermediate and offset other end portions of said first buckle member engaging the second strap end loop portion during strap tightening buckle interengagement and slidably camming said adjusting member into positive strap clamping engagement with the second buckle end bar and being liftable to disengage the first buckle member from clamping engagement with the second strap end loop and from the tongue end portion of the second buckle member.

5. A buckle for interconnecting first and second strap ends, said buckle comprising
a first buckle member attachable to one of the strap ends and having a transverse slot therein,
a second buckle member having a tongue forming end portion of reduced width insertable through the slot in the first buckle member to interengage the buckle members,
the other end portion of the second buckle member being offset and having two transverse slots spaced from the tongue end portion and forming a first bar extending between the two slots and a transverse end bar,
and a strap adjusting member of channeled U-section slidably mounted on the first bar of the second buckle member, having a rounded bight portion extending through the slot formed adjacent the tongue end portion, and having spaced parallel edges opening toward and overlying the other parallel slot for strap clamping engagement with the adjacent second buckle end bar,
the transverse slots of the second buckle member being adapted to threadably receive a second strap end loop portion embracing the strap adjusting member and passing between the adjusting member and the second buckle end bar for strap tightening adjustment tending to shift and maintain the adjusting member in strap securing engagement against said second buckle end bar, and said first buckle member having an intermediate portion engageable with the second strap end loop portion during strap tightening adjustment of the interengaged buckle members to slidably cam the adjusting member into positive strap clamping engagement with the second buckle end bar.

6. A buckle for connecting first and second strap members comprising first and second buckle members, the first buckle member having a transverse slot adjacent one end thereof forming an end bar embraceable by the first strap member, one end of the second buckle member being bent to form a tongue insertable through the slot to interengage the buckle members and clamp the first strap member against the first buckle end bar, and means connecting the second strap member to an intermediate portion of the second buckle member for positioning the second strap member relative to the first buckle member, the first buckle member having a portion lockingly clamping the second strap member in a selected position to the intermediate portion of the second buckle member upon buckle interengagement.

7. The buckle recited in claim 6, wherein the other end of the first buckle member includes a handle portion operable to disengage the buckle members.

8. A buckle for connecting first and second strap members comprising first and second relatively flat buckle members, the first buckle member being bent intermediate its ends to form offset end portions and having a transverse slot adjacent one end thereof forming an end bar embraceable by the first strap member, one end portion of the second buckle member being bent to form a tongue insertable through the slot to interengage the buckle members and clamp the first strap member against the end bar of the first buckle member, the other end portion of the second buckle member having an end bar, and a strap adjusting member slidably mounted on the second buckle member and embraceable by a loop portion of the second strap member passing between the adjusting member and the second buckle end bar for positioning the second strap member relative to the first buckle member, the bent intermediate portion of the first buckle member being engageable with the loop portion of the second strap member during buckle interengagement to slidably cam the adjusting member toward the second buckle member end bar to lockingly clamp a portion of said loop portion thereagainst in a selected position.

References Cited by the Examiner

UNITED STATES PATENTS

| 2,292,553 | 8/1942 | Versoy | 24—75 |
| 2,823,437 | 2/1958 | Anderson | 24—197 |
| 3,081,506 | 3/1963 | Niguchi | 24—75 |

FOREIGN PATENTS

| 779,184 | 1/1935 | France. |

WILLIAM FELDMAN, *Primary Examiner.*

E. SIMONSEN, *Assistant Examiner.*